Aug. 26, 1930.  A. P. J. BOESEN  1,773,939
POWER SUPPLY SYSTEM
Filed March 24, 1925   3 Sheets-Sheet 3
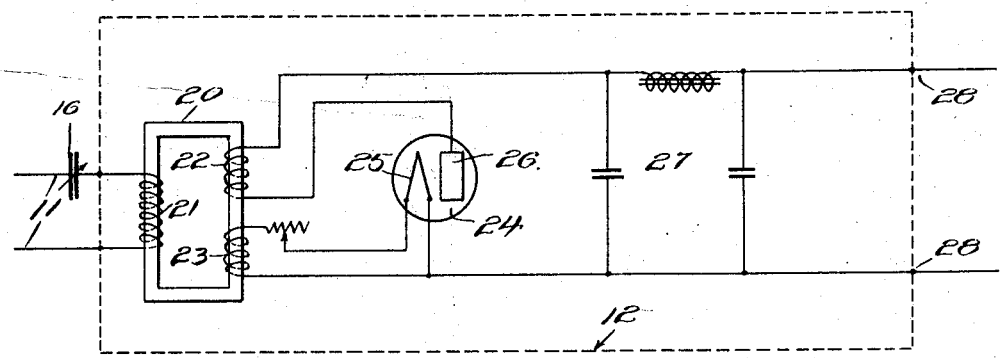
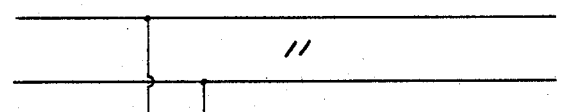
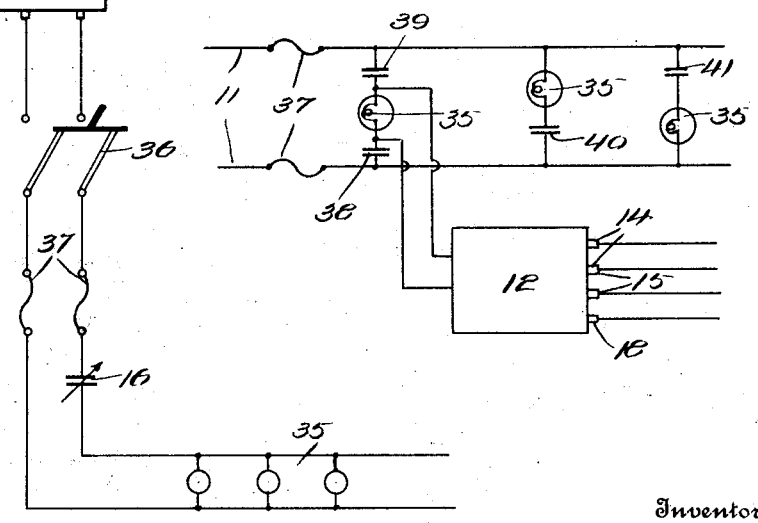
Inventor
Anthony Phillip James Boesen,
By John B. Brady
Attorney Patented Aug. 26, 1930

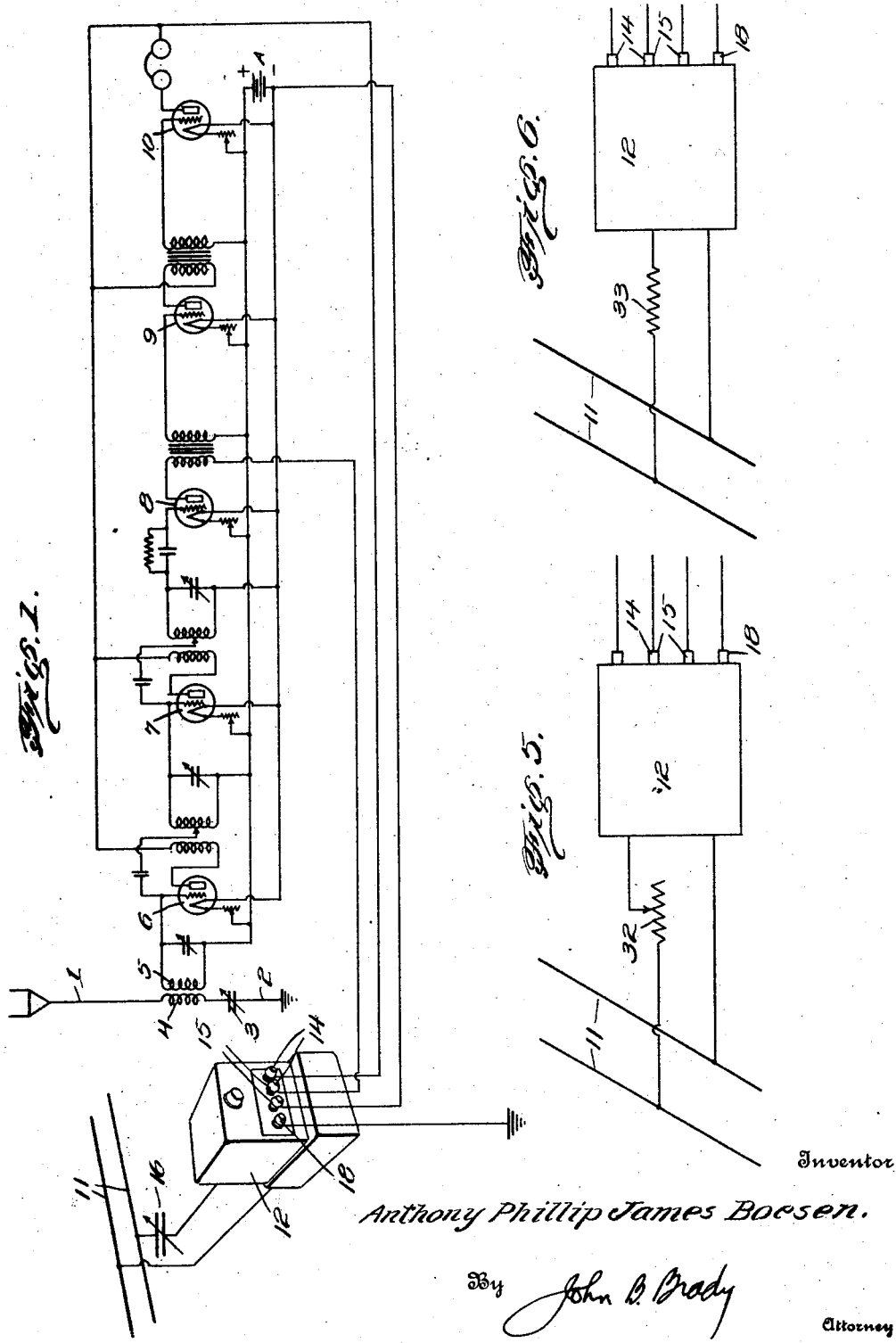

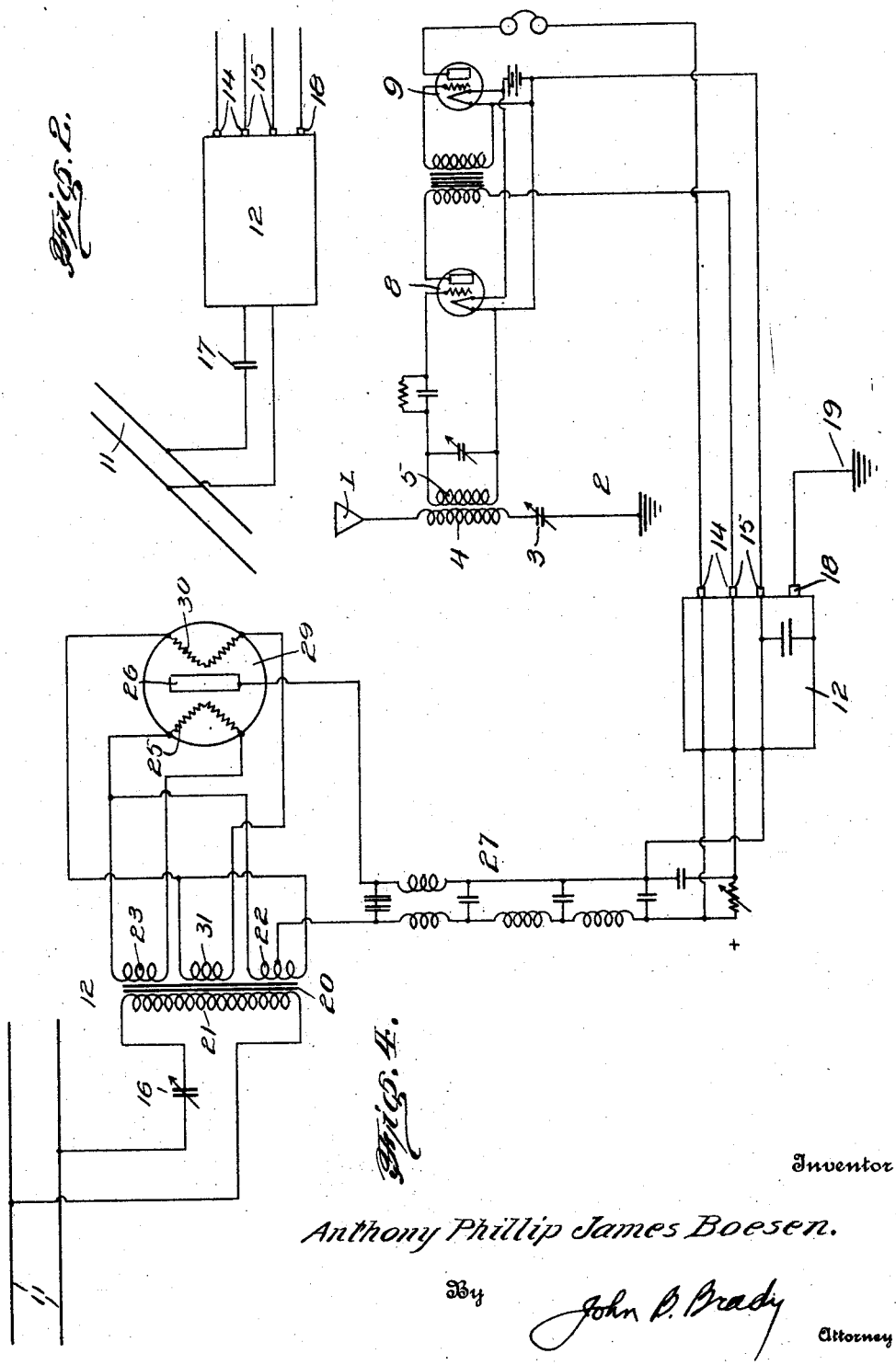

1,773,939

UNITED STATES PATENT OFFICE

ANTHONY PHILLIP JAMES BOESEN, OF RICHMOND HILL, NEW YORK

POWER-SUPPLY SYSTEM

Application filed March 24, 1925. Serial No. 17,989.

My invention relates broadly to an electrical power system and more particularly to a power supply system having means for protecting the electrical apparatus from destruction from sudden excess currents.

The object of my invention is to provide a protective power supply system for apparatus with means interposed between the power supply line and the electrical apparatus whereby excessive currents normally arising upon short circuits which may occur in different parts of the electrical apparatus, which currents would normally destroy the apparatus in the power supply system, are prevented.

Another object of my invention is to provide an inexpensive protective unit which may be interposed in the line circuit between the power supply and the electrical apparatus which operates to permit the passage of current from the power supply system to the apparatus to eliminate the destructive effects of excessive currents which may be set up upon the occurrence of short circuits or other change in condition of the electrical apparatus.

A still further object of my invention is to provide an inexpensive protective unit having means which may be interposed in both sides of a power line before the load for the protection of all apparatus in the system.

My invention finds particular application in alternating current power supply systems for protecting electrical apparatus connected in such a system from excessive currents which may exist by a change in condition of the load. I have illustrated two embodiments of my invention which will be hereinafter more fully described, but I desire that it be understood that the invention has many applications and that the applications disclosed herein are to be considered in the illustrative sense and that the invention is not limited to the uses shown. I have described the invention with particular reference to electron tube radio receiving circuits in which power is supplied for the anode circuits of the electron tubes from an alternating current power supply system in which the alternating current is rectified before being impressed on the anode circuits and wherein I provide means for protecting the rectifying apparatus and the electron tube circuits of the radio receiving apparatus. I have also shown my invention as applied to the protection of alternating current lighting circuits for residence illumination in which the distributing lines in the home, the incandescent lights, the meter and the fuses are protected against excessive currents arising under conditions of variation in load or excessive currents by means interposed between the alternating current power supply, and the load.

I have discovered that in an electron tube radio receiving system employing a relatively large number of tubes the cathodes of which are parallelly connected and draw a relatively heavy current that the rectifying apparatus employed to impress direct current upon the anodes of the tubes offers a serious maintenance problem. There is a tendency for the elements of the rectifying tube in the rectifying apparatus to contact with each other due to shock vibration or change in position of the cathode in accordance with temperature variation. The cathode of the rectifier tube will expand under conditions of increase in temperature and will normally sag to one side. The condition of sag may become so great that the cathode will actually contact with the anode, resulting in a short circuit of the system, the setting up of excess currents and the destruction of associated windings of the transformer in the rectifying apparatus. This slight change in relative position of the elements within the rectifier tube may thereafter result in the destruction of the expensive rectifier apparatus and continuance of this condition may result in the burning out of the fuses in the lighting circuit. By my invention I interpose in either side or leg in the alternating current power supply line a capacity or resistance unit, the value of which is proportioned to the characteristics of the transformer or the normal load impressed upon the rectifying tube. The capacity or resistance element may be made variable in order that the proper value may be exactly selected.

My invention will be more clearly understood by reference to the accompanying drawings in which Fig. 1 is a diagrammatic view showing the application of my invention to a radio receiving apparatus where the protective means has the form of a variable condenser; Fig. 2 is a diagrammatic view illustrating the protective means in the alternating current power supply circuit in the form of a fixed condenser; Fig. 3 illustrates the application of my invention in connection with a half cycle rectifier; Fig. 4 illustrates my invention as applied to a complete cycle rectifier and illustrating connections to a radio receiving circuit; Fig. 5 illustrates my invention with a variable resistance element interposed in the line; Fig. 6 illustrates my invention with a fixed resistance element located in the line circuit on the power side of the rectifying apparatus; Fig. 7 illustrates the application of my invention as a protective means for incandescent lighting systems; and Fig. 8 shows a modified arrangement in which protective means are interposed in both sides of the power supply line before the load for the protection of all apparatus in the system.

I have selected for illustration the complete cycle rectifier apparatus known as the Super-Ducon, as manufactured by the Dubilier Condenser and Radio Corporation. It is expressly understood however that my invention is applicable to other types of rectifying units known commercially as B eliminators, and that I do not intend that the invention be limited for use with the Super-Ducon.

Referring to the drawings in more detail, Fig. 1 illustrates a radio receiving system including a radio frequency amplifier, a detector and an audio frequency amplifier. The receiving apparatus is connected to an antenna ground system indicated by reference characters 1 and 2 including tuning condenser 3 and primary inductance 4, coupled with secondary inductance 5. The apparatus includes electron tubes 6 and 7 connected for radio frequency amplification and tube 8 arranged as a detector. Audio frequency amplifier tubes 9 and 10 are connected after detector tube 8. The cathodes of the several tubes are supplied from a battery A while the anodes are supplied with energy from rectifying apparatus 12. The alternating current power supply line has been represented at 11 with connection between the power supply line and the rectifying apparatus 12. The variable capacity element is interposed in these connections as indicated at 16 in accordance with the principle of my invention. The terminals 14 on the front panel of the rectifying apparatus supply the anode potential for the amplifier tubes. Terminals 15 supply the anode potential for the detector tube 8. The terminal 18 is connected to ground as indicated at 19, the terminal 18 being connected to the metallic case of the rectifying apparatus 12. The capacity 16 is illustrated as variable in Fig. 1, although it may be fixed in proportion to the load as represented at 17 in Fig. 2.

The principle of my invention will be better understood from Fig. 3 wherein the fundamental circuit within a half cycle rectifying apparatus is illustrated. The rectifying apparatus includes a transformer 20 having a primary winding 21 and a pair of secondary windings 22 and 23. The primary winding 21 is connected with an alternating current power supply line through the variable capacity unit 16. The rectifier tube 24 is provided having a cathode 25 energized from secondary winding 23 and plate 26 is connected with secondary or plate winding 22. A filter circuit is provided which is connected across the cathode and anode terminals as illustrated for delivering direct current impulses to the terminals 28. In the event that a short circuit occurs in the circuit including the rectifier tube 24 there is a tendency for excessive currents to be set up which normally result in the destruction of the transformer windings 21, 22 and 23. By the provision of the element 16 in the power supply circuit I have found that under conditions of short circuit the transformer windings are saved even though the condition of short circuit may endure for a considerable period of time extending for example over a period of forty-eight hours. In Fig. 4 the application of the invention to a complete cycle rectifier tube 29 has been illustrated wherein two cathodes 25 and 30 are provided and heated from secondary windings 23 and 31 respectively. The central anode 26 is supplied with power from secondary winding 22 and rectified energy is delivered through filter circuit 27 to terminals 14, 15, for the supplying of the anode circuits of the detector system 8 and the amplifier system 9 as hereinbefore described. Any tendency of the rectifying system to short circuit fails to destroy the transformer within the rectifying apparatus by reason of the provision of the capacity means 16 which is adjusted in value in proportion to the load drawn from the transformer. In Fig. 5 I have shown a resistance member 32 interposed in the alternating current power supply line between the power supply and the rectifying system 12. This resistance may be variable or as indicated in Fig. 6 the resistance may be fixed in value as indicated at 33 in Fig. 6. In all cases the value of the elements 16, 17, 32 or 33 depend upon the load drawn from the rectifying system. These elements are electrically proportioned to the low frequency alternating current power supply as to offer small impedance to the passage of the alternating current to the load while establishing an infinite resistance to direct currents or currents tending to oppose the alternating current supply. While the insertion of this protective element in the power supply line tends to somewhat reduce the energy delivered by the rectifying system the value may be selected where the energy is not reduced below a workable value for a multiple tube radio receiving system and yet the system is entirely protected against excessive currents as hereinbefore explained.

In Fig. 7 the alternating current power supply lines 11 are illustrated as having a meter 34 connected therewith and connections to a house lighting circuit 35 to a main switch 36 and fuses 37. The variable capacity element is interposed in the line as indicated at 16. I have found that this element protects the system against short circuits which may occur in the lighting system represented at 25. It is also desirable in some systems to interpose a protective device such as condensers 38 and 39 in each side of the line 11 between the power supply and the load. The incandescent lamps 35 are likewise protected by means of series condensers 40 and 41. A short circuit across any of the lamps 35 does not result in the blowing of fuses 37 nor is any injury caused to the load 35, or apparatus 12, the meter or other parts of the lighting system.

I do not desire to be limited to a particular explanation of my invention at this time for it will suffice to say that I have demonstrated the effectiveness of my invention and that it has operated with entire success in the circuit arrangements illustrated.

What I claim and desire to secure by Letters Patent of the United States is as follows:

1. A power supply system comprising in combination an alternating current line wire circuit, a load circuit, apparatus operated from said alternating current line wire circuit and means for protecting said apparatus from excessive currents in said load circuit consisting of a capacity element interposed in series in one side of said alternating current line wire circuit and having small impedance to the passage of alternating current to said apparatus but offering infinite impedance to destructive currents.

2. A power supply system for electron tubes comprising in combination a plurality of electron tubes each having a cathode, an anode circuit for each of said tubes, a source of alternating current, a rectifying system for impressing substantially direct current from said source of alternating current on each of said anode circuits, and capacity means in series with one side of said source and having a value so related to the normal operating potential of each of said anode circuits to permit a proper value of direct current to be impressed upon each of said anode circuits while preventing destruction of said rectifying system due to excessive currents.

3. A power supply system comprising in combination an alternating current line wire circuit, a load circuit, apparatus operated from said alternating current line wire circuit, means for protecting said apparatus from excessive currents in said load circuit consisting of capacity elements interposed in series in both sides of said alternating current line circuit, whereby the entire cycle of said alternating current may be utilized in said load circuit, said capacity elements each having small impedance to the passage of said alternating current to said load circuit but offering infinite impedance to the passage of destructive currents to said apparatus.

In testimony whereof I affix my signature.

ANTHONY PHILLIP JAMES BOESEN.